United States Patent
Goodwin et al.

(10) Patent No.: US 7,103,499 B2
(45) Date of Patent: Sep. 5, 2006

(54) 3-D SELECTION AND MANIPULATION WITH A MULTIPLE DIMENSION HAPTIC INTERFACE

(75) Inventors: William Alexander Goodwin, Somerville, MA (US); Joshua Eric Handley, Cambridge, MA (US); Philip Brown Winston, Providence, RI (US)

(73) Assignee: SensAble Technologies, Inc., Woburn, MA (US)

( * ) Notice: Subject to any disclaimer, the term of this patent is extended or adjusted under 35 U.S.C. 154(b) by 236 days.

(21) Appl. No.: 10/650,155

(22) Filed: Aug. 28, 2003

(65) Prior Publication Data

US 2005/0197800 A1    Sep. 8, 2005

Related U.S. Application Data

(63) Continuation of application No. 10/133,242, filed on Apr. 26, 2002, now Pat. No. 6,671,651.

(51) Int. Cl.
*G06F 15/00* (2006.01)
*B25J 9/10* (2006.01)
*G05B 19/00* (2006.01)

(52) U.S. Cl. ............... 702/152; 702/150; 702/153; 318/568.11; 318/568.17

(58) Field of Classification Search ............... 702/150, 702/152, 153, 188; 700/245, 247, 250, 260–262; 600/300, 428; 345/419, 420, 582, 156, 157; 318/568.11, 568.17
See application file for complete search history.

(56) References Cited

U.S. PATENT DOCUMENTS

| | | | |
|---|---|---|---|
| 2,475,484 A | 7/1949 | DeNise | 318/628 |
| 3,168,203 A | 2/1965 | Gallistel | 214/1 |
| 3,263,824 A | 8/1966 | Jones et al. | 214/1 |
| 3,449,008 A | 6/1969 | Colechia | 294/88 |
| 3,531,868 A | 10/1970 | Stevenson | 33/174 |
| 3,618,786 A | 11/1971 | Fick | 214/1 CM |
| 3,637,092 A | 1/1972 | George et al. | 214/1 CM |
| 3,920,972 A | 11/1975 | Corwin et al. | 235/151.1 |

(Continued)

FOREIGN PATENT DOCUMENTS

EP    0 915 434 A2    5/1999

(Continued)

OTHER PUBLICATIONS

Adachi, "Touch and Trace on the Free-Form Surface of Virtual Object," Proceedings of the IEEE Virtual Reality Annual International Symposium, Sep. 18-22, 1993, Seattle WA, pp. 162-168.

(Continued)

*Primary Examiner*—Bryan Bui
(74) *Attorney, Agent, or Firm*—Goodwin Procter LLP

(57) ABSTRACT

Systems and methods provide a user the ability to select three-dimensional virtual objects in a three-dimensional modeling environment using two-dimensional representations of the objects. In broad overview, the invention involves a multidimensional degree of freedom haptic interface that controls a three-dimensional cursor. A user employs the cursor to select an arbitrary point on a three-dimensional virtual object of interest. Through the application of a mathematical transformation, the system displays the cursor at the location of the selected point on the object. The user can manipulate the object by operating the haptic interface. The systems and methods provide the user with the possibility of editing the selected virtual object. In one embodiment, editing includes sculpting the object. When the user releases the object after manipulation is completed, the cursor is relocated to the position the cursor would have had had the manipulations been applied to the cursor directly.

16 Claims, 8 Drawing Sheets

U.S. PATENT DOCUMENTS

| | | | |
|---|---|---|---|
| 3,944,798 A | 3/1976 | Eaton | 235/161.3 |
| 4,062,455 A | 12/1977 | Flatau | 214/1 |
| 4,150,803 A | 4/1979 | Fernandez | 244/135 A |
| 4,216,467 A | 8/1980 | Colston | 340/365 L |
| 4,302,138 A | 11/1981 | Zarudiansky | 414/5 |
| 4,367,532 A | 1/1983 | Crum et al. | 364/513 |
| 4,420,808 A | 12/1983 | Diamond et al. | 364/434 |
| 4,521,685 A | 6/1985 | Rebman | 250/229 |
| 4,604,016 A | 8/1986 | Joyce | 414/7 |
| 4,632,341 A | 12/1986 | Repperger et al. | 244/230 |
| 4,638,798 A | 1/1987 | Shelden et al. | 128/303 B |
| 4,653,011 A | 3/1987 | Iwano | 364/513 |
| 4,654,648 A | 3/1987 | Herrington et al. | 340/710 |
| 4,655,673 A | 4/1987 | Hawkes | 414/730 |
| 4,661,032 A | 4/1987 | Arai | 414/5 |
| 4,670,851 A | 6/1987 | Murakami et al. | 364/518 |
| 4,676,002 A | 6/1987 | Slocum | 33/1 MP |
| 4,680,519 A | 7/1987 | Chand et al. | 318/568 |
| 4,703,443 A | 10/1987 | Moriyasu | 364/559 |
| 4,729,098 A | 3/1988 | Cline et al. | 364/414 |
| 4,769,763 A | 9/1988 | Trieb et al. | 364/559 |
| 4,791,934 A | 12/1988 | Brunnett | 128/653 |
| 4,795,296 A | 1/1989 | Jau | 414/5 |
| 4,800,721 A | 1/1989 | Cemenska et al. | 60/393 |
| 4,819,195 A | 4/1989 | Bell et al. | 364/571.1 |
| 4,823,634 A | 4/1989 | Culver | 74/471 |
| 4,837,734 A | 6/1989 | Ichikawa et al. | 364/513 |
| 4,839,838 A | 6/1989 | LaBiche et al. | 364/709.1 |
| 4,853,874 A | 8/1989 | Iwamoto et al. | 364/513 |
| 4,888,538 A | 12/1989 | Dimitrov et al. | 318/675 |
| 4,893,981 A | 1/1990 | Yoshinada et al. | 414/5 |
| 4,907,970 A | 3/1990 | Meenen, Jr. | 434/45 |
| 4,907,973 A | 3/1990 | Hon | 434/262 |
| 4,942,538 A | 7/1990 | Yuan et al. | 364/513 |
| 4,945,305 A | 7/1990 | Blood | 324/207.2 |
| 4,945,501 A | 7/1990 | Bell et al. | 364/571.1 |
| 4,961,138 A | 10/1990 | Gorniak | 364/200 |
| 4,973,215 A | 11/1990 | Karlen et al. | 414/729 |
| 4,982,504 A | 1/1991 | Söderberg et al. | 33/502 |
| 4,988,981 A | 1/1991 | Zimmerman et al. | 340/709 |
| 5,004,391 A | 4/1991 | Burdea | 414/6 |
| 5,007,300 A | 4/1991 | Siva | 74/471 X |
| 5,018,922 A | 5/1991 | Yoshinada et al. | 414/5 |
| 5,019,761 A | 5/1991 | Kraft | 318/568.1 |
| 5,038,089 A | 8/1991 | Szakaly | 318/568.1 |
| 5,040,306 A | 8/1991 | McMurtry et al. | 33/556 |
| 5,044,956 A | 9/1991 | Behensky et al. | 434/45 |
| 5,053,975 A | 10/1991 | Tsuchihashi et al. | 364/513 |
| 5,072,361 A | 12/1991 | Davis et al. | 364/167 |
| 5,088,046 A | 2/1992 | McMurtry | 364/474 |
| 5,088,055 A | 2/1992 | Oyama | 364/560 |
| 5,103,404 A | 4/1992 | McIntosh | 318/568.2 |
| 5,105,367 A | 4/1992 | Tsuchihashi et al. | 395/99 |
| 5,116,051 A | 5/1992 | Moncrief et al. | 273/448 B |
| 5,116,180 A | 5/1992 | Fung et al. | 414/5 |
| 5,130,632 A | 7/1992 | Ezawa et al. | 318/568.1 |
| 5,131,844 A | 7/1992 | Marinaccio et al. | 433/72 |
| 5,142,931 A | 9/1992 | Menahem | 74/471 XY |
| 5,143,505 A | 9/1992 | Burdea et al. | 414/5 |
| 5,184,319 A | 2/1993 | Kramer | 364/806 |
| 5,185,561 A | 2/1993 | Good et al. | 318/432 |
| 5,189,806 A | 3/1993 | McMurtry et al. | 33/503 |
| 5,193,963 A | 3/1993 | McAffee et al. | 414/5 |
| 5,204,824 A | 4/1993 | Fujimaki | 364/474 |
| 5,220,260 A | 6/1993 | Schuler | 318/561 |
| 5,223,776 A | 6/1993 | Radke et al. | 318/568.1 |
| 5,237,647 A | 8/1993 | Roberts et al. | 345/419 |
| 5,239,246 A | 8/1993 | Kim | 318/568.1 |
| 5,255,211 A | 10/1993 | Redmond | 364/578 |
| 5,264,768 A | 11/1993 | Gregory et al. | 318/561 |
| 5,266,875 A | 11/1993 | Slotine et al. | 395/99 X |
| 5,333,257 A | 7/1994 | Merrill et al. | 345/467 |
| 5,354,162 A | 10/1994 | Burdea et al. | 414/5 |
| 5,382,885 A | 1/1995 | Salcudean et al. | 318/568.1 |
| 5,389,865 A | 2/1995 | Jacobus et al. | 318/568.1 |
| 5,396,265 A | 3/1995 | Ulrich et al. | 345/158 |
| 5,414,337 A | 5/1995 | Schuler | 318/561 |
| 5,429,140 A | 7/1995 | Burdea et al. | 128/774 |
| 5,438,529 A | 8/1995 | Rosenberg et al. | 364/709.1 |
| 5,446,834 A | 8/1995 | Deering | 345/427 |
| 5,459,382 A | 10/1995 | Jacobus et al. | 318/568.1 |
| 5,482,051 A | 1/1996 | Reddy et al. | 128/733 |
| 5,489,830 A | 2/1996 | Fernandez | 318/628 |
| 5,497,452 A | 3/1996 | Shimizu et al. | 395/120 |
| 5,515,078 A | 5/1996 | Greschler et al. | 345/156 |
| 5,555,894 A | 9/1996 | Doyama et al. | 128/782 |
| 5,559,412 A | 9/1996 | Schuler | 318/561 |
| 5,576,727 A | 11/1996 | Rosenberg et al. | 345/179 |
| 5,587,937 A | 12/1996 | Massie et al. | 364/578 |
| 5,589,854 A | 12/1996 | Tsai | 345/161 |
| D377,932 S | 2/1997 | Schena et al. | D14/114 |
| 5,623,582 A | 4/1997 | Rosenberg | 395/99 |
| 5,623,642 A | 4/1997 | Katz et al. | 395/500 |
| 5,625,576 A | 4/1997 | Massie et al. | 364/578 |
| 5,629,594 A | 5/1997 | Jacobus et al. | 318/568.1 |
| 5,642,469 A | 6/1997 | Hannaford et al. | 395/99 |
| 5,659,493 A | 8/1997 | Kiridena et al. | 703/2 |
| 5,666,138 A | 9/1997 | Culver | 345/161 |
| 5,691,898 A | 11/1997 | Rosenberg et al. | 364/190 |
| 5,694,013 A | 12/1997 | Stewart et al. | 318/561 |
| 5,701,140 A | 12/1997 | Rosenberg et al. | 345/156 |
| 5,721,566 A | 2/1998 | Rosenberg et al. | 345/161 |
| 5,724,264 A | 3/1998 | Rosenberg et al. | 364/559 |
| 5,731,804 A | 3/1998 | Rosenberg | 345/156 |
| 5,734,373 A | 3/1998 | Rosenberg et al. | 345/161 |
| 5,737,505 A | 4/1998 | Shaw et al. | 395/119 |
| 5,739,811 A | 4/1998 | Rosenberg et al. | 345/161 |
| 5,742,278 A | 4/1998 | Chen et al. | 345/156 |
| 5,751,289 A | 5/1998 | Myers | 345/419 |
| 5,754,023 A | 5/1998 | Roston et al. | 318/561 |
| 5,767,839 A | 6/1998 | Rosenberg | 345/161 |
| 5,769,640 A | 6/1998 | Jacobus et al. | 434/262 |
| 5,774,130 A | 6/1998 | Horikawa et al. | 345/441 |
| 5,784,542 A | 7/1998 | Ohm et al. | 395/95 |
| 5,790,108 A | 8/1998 | Salcudean et al. | 345/184 |
| 5,798,752 A | 8/1998 | Buxton et al. | 345/146 |
| 5,800,177 A | 9/1998 | Gillio | 434/262 |
| 5,800,178 A | 9/1998 | Gillio | 434/262 |
| 5,800,179 A | 9/1998 | Bailey | 434/262 |
| 5,802,353 A | 9/1998 | Avila et al. | 395/500 |
| 5,803,738 A | 9/1998 | Latham | 434/29 |
| 5,805,140 A | 9/1998 | Rosenberg et al. | 345/161 |
| 5,821,920 A | 10/1998 | Rosenberg et al. | 345/156 |
| 5,825,308 A | 10/1998 | Rosenberg | 341/20 |
| 5,828,197 A | 10/1998 | Martin et al. | 318/567 |
| 5,831,408 A | 11/1998 | Jacobus et al. | 318/568.1 |
| 5,844,392 A | 12/1998 | Peurach et al. | 318/568.2 |
| 5,847,956 A | 12/1998 | Bronfeld et al. | 700/98 |
| 5,859,934 A | 1/1999 | Green | 382/296 |
| 5,872,438 A | 2/1999 | Roston | 318/568.11 |
| 5,873,106 A | 2/1999 | Joseph | 715/506 |
| 5,880,714 A | 3/1999 | Rosenberg et al. | 345/156 |
| 5,882,206 A | 3/1999 | Gillio | 434/262 |
| 5,889,670 A | 3/1999 | Schuler et al. | 364/186 |
| 5,898,599 A | 4/1999 | Massie et al. | 345/161 |
| 5,903,270 A | 5/1999 | Gentry et al. | |
| 5,903,886 A | 5/1999 | Heimlich et al. | 706/50 |
| 5,907,487 A | 5/1999 | Rosenberg et al. | 364/190 |
| 5,913,727 A | 6/1999 | Ahdoot | 463/39 |
| 5,929,607 A | 7/1999 | Rosenberg et al. | 320/166 |
| 5,929,846 A | 7/1999 | Rosenberg et al. | 345/161 |
| 5,956,484 A | 9/1999 | Rosenberg et al. | 395/200.3 |
| 5,963,212 A | 10/1999 | Bakalash | |
| 5,973,678 A | 10/1999 | Stewart et al. | 345/184 |

| | | | |
|---|---|---|---|
| 5,988,862 A | 11/1999 | Kacyra et al. | 703/6 |
| 6,064,394 A | 5/2000 | Morrison | |
| 6,084,587 A | 7/2000 | Tarr et al. | 345/419 |
| 6,111,577 A | 8/2000 | Zilles et al. | 345/701 |
| 6,191,796 B1 | 2/2001 | Tarr | 345/433 |
| 6,211,848 B1 | 4/2001 | Plesniak et al. | 345/156 |
| 6,226,003 B1 | 5/2001 | Akeley | 345/419 |
| 6,308,144 B1 | 10/2001 | Bronfeld et al. | 703/2 |
| 6,337,678 B1 | 1/2002 | Fish | 345/156 |
| 6,342,880 B1 | 1/2002 | Rosenberg et al. | 345/161 |
| 6,369,834 B1 | 4/2002 | Zilles et al. | 345/701 |
| 6,384,822 B1 | 5/2002 | Bilodeau et al. | 345/422 |
| 6,417,638 B1 | 7/2002 | Guy et al. | 318/560 |
| 6,421,048 B1 | 7/2002 | Shih et al. | 345/419 |
| 6,552,722 B1 | 4/2003 | Shih et al. | 345/19 |
| 6,608,631 B1 | 8/2003 | Milliron | |
| 6,734,847 B1 * | 5/2004 | Baldeweg et al. | 345/419 |
| 6,961,055 B1 * | 11/2005 | Doak et al. | 345/419 |
| 2002/0075283 A1 | 6/2002 | Payne | 345/643 |
| 2002/0089500 A1 | 7/2002 | Jennings et al. | 345/420 |
| 2002/0158842 A1 | 10/2002 | Guy et al. | 345/156 |
| 2003/0117411 A1 | 6/2003 | Fujiwara et al. | |
| 2003/0128208 A1 | 7/2003 | Shih et al. | 345/419 |
| 2004/0034282 A1 * | 2/2004 | Quaid, III | 600/300 |

FOREIGN PATENT DOCUMENTS

| | | |
|---|---|---|
| WO | WO 95/02801 | 1/1995 |
| WO | WO 96/16397 | 5/1996 |
| WO | WO 96/22591 | 7/1996 |
| WO | WO 96/42078 | 12/1996 |
| WO | WO 97/06410 | 2/1997 |
| WO | WO 97/12337 | 4/1997 |
| WO | WO 97/12357 | 4/1997 |
| WO | WO 97/19440 | 5/1997 |
| WO | WO 97/21160 | 6/1997 |
| WO | WO 97/44775 | 11/1997 |
| WO | WO 98/06024 | 2/1998 |
| WO | WO 98/26342 | 6/1998 |
| WO | WO 98/30951 | 7/1998 |
| WO | WO 98/58308 | 12/1998 |
| WO | WO 98/58323 | 12/1998 |
| WO | WO 99/10872 | 3/1999 |

OTHER PUBLICATIONS

Agrawala et al., "D Painting on Scanned Surfaces", Stanford University, 1995, pp. 145-150.
Atkinson et al., "Computing with Feeling" Comput. & Graphics, vol. 2, 1977, pp. 97-103.
Avila et al., "A Haptic Interaction Method for Volume Visualization," GE Corporate Research & Developmemt, Schenectady, NY, pp. 1-9 (1996).
Barr, "Global and Local Deformations of Solid Primitives"; Computer Graphics; vol. 18, No. 3, pp. 21-30 (Jul. 1984).
Bergamasco, "Design of Hand Force Feedback Systems for Glove-like Advanced Interfaces", IEEE, Sep. 1992, pp. 286-293.
Blinn, "Simulation of Wrinkled Surfaces," Computer Graphics, vol. 12-3, Aug. 1978, pp. 286-292.
Brooks et al., "Project Grope—Haptic Displays for Scientific Visualization," Computer Graphics, vol. 24, No. 4, Aug. 1990, pp. 177-185.
Burdea, "Force And Touch Feedback For Virtual Reality," John Wiley and Sons, Inc., New York, New York, pp. 190-193 (1996).
Colgate et al., "Factors Affecting the Z-Width of a Haptic Display," published by IEEE Computer Society Press, Los Alamitos, California, in Proceedings: 1994 IEEE International Conference On Robotics and Automation, held May 8-13, 1994 in San Diego, California, vol. 4, 1994, pp. 3205-3210.
Colgate et al., "Implementation of Stiff Virtual Walls in Force Reflecting Interfaces," IEEE Virtual Reality Annual International Symposium (Seattle, WA), pp. 202-208 (Sep. 18-22, 1993).
Colgate et al., "Issues in the Haptic Display of Tool Use," published by IEEE Computer Society Press, Los Alamitos, California, in Proceedings: 1995 IEEE/RSJ International Conference on Intelligent Robots and Systems—Human Robot Interaction and Cooperative Robots, held Aug. 5-9, 1995 in Pittsburgh, Pennsylvania, 1995, pp. 140-145.
Decaudin, "Geometric Deformation by Merging a 3D-Object with a Simple Shape," Graphics Interface '96 Proceedings (Toronto, Canada), 6 pgs. (May 21-24, 1996).
Dworkin et al., "A New Model for Efficient Dynamic," Fourth Eurographics Animation and Simulation Workshop Proceedings Eurographics Technical Report Series, ISSN 1017-4656, Sep. 4-5, 1993, pp. 135-147.
Galyean, "Sculpting: An Interactive Volumetric Modeling Technique," Computer Graphics (SIGGRAPH '91 Las Vegas), vol. 25, No. 4, pp. 267-274 (Jul. 1991).
Hashimoto et al., "Dynamic Force Simulator for Force Feedback Human-Machine Interaction", IEEE, Sep. 1993, pp. 209-215.
Hirata et al., "3-Dimensional Interface Device for Virtual Work Space," Proceedings of the 1992 IEEE, Jul. 7-10, 1992, pp. 889-896.
Hirota et al., "Providing Force Feedback in Virtual Environments", IEEE, Sep. 1995, pp. 22-30.
Hirota et al., "Development of Surface Display," Proceedings of the Virtual Reality Annual International Symposium (Seattle), pp. 256-262 (Sep. 18-23, 1993).
Howe et al., "Task Performance with a Dextrous Teleoperated Hand System," Telemanipulator Technology, Nov. 1992, Proceedings of SPIE, vol. 1833, pp. 1-9.
Immersion Corporation, "Impulse Engine 2000," http://www.immerse.com/WWWpages/IE2000pg.htm, 2 pages (1997).
Immersion Corporation, "Laparoscopic Impulse Engine☐:A New Force Feedback Surgical Simulation Tool", Immersion Corporation, 1995. http://www.immerse.com/www.pages/lapIEpg.htm.
Immersion Corporation, "The Impulse Engine☐", 1 page, Immersion Corporation, 1996.
Immersion Corporation, "Virtual Laparoscopic Interface", Immersion Corporation, 1995 1 pg.
Inoue et al., "Parallel Manipulator," Proceedings of 3rd Robotics Research: The Third International Symposium, Faugeras & Giralt, eds., MIT Press 1986.
Ishii et al., "A 3D Interface Device with Force Feedback: A Virtual Work Space for Pick-and-Place Tasks", IEEE, Sep. 1993, pp. 331-335.
Iwata, "Pen-based Haptic Virtual Environment," Proceedings of IEEE Virtual Reality Annual International Symposium, (Sep. 18-22, 1993, Seattle, WA), pp. 287-292.
Iwata, "Artificial Reality with Force feedback: Development of Desktop Virtual Space with Compact Master Manipulator," Computer Graphics (SIGGRAPH '90 Dallas), vol. 24, No. 4, pp. 165-170 (Aug. 1990).
Kelley et al. "MagicMouse: Tactile and Kinesthetic Feedback in the Human-Computer Interface Using an Electromagnetically Actuated Input/Output Device," Department of Electrical Engineering, University of British Columbia, Vancouver, BC, V6T 1Z4, Canada, Oct. 19, 1993, pp. 1-27.
Kotoku et al., "A Force Display Algorithm for Virtual Environments," SICE, pp. 347-355, 1992.
Kraft Ocean Systems, "GRIPS Underwater Manipulator System".
Kraft Telerobotics, Inc., "GRIPS Force Feedback Manipulator System".
Kraft Telerobotics, Inc., "GRIPS Master/Slave Manipulator System" 1988..
Lewis, "Electronic Pen With Its Own Eraser", Personal Computers, Jul. 1995, p. C8.
Marcus et al., "EXOS Research on Master Controllers for Robotic Devices," Fifth Annual Workshop on Space Operations Applications and Research (SOAR '91) pp. 238-245, Jul. 1991.
Massie, "Design of a Three Degree of Freedom Force-Reflecting Haptic Interface", Massachusetts Institute of Technology; Bachelor of Science in Electrical Science and Engineering Thesis, May 1993, pp. 1-38.

Massie, "Initial Haptic Explorations with the Phantom: Virtual Touch Through Point Interaction", Massachusetts Institute of Technology Master of Science Thesis, Feb. 1996, pp. 1-49. (not admitted as prior art).

McAffee et al, "Teleoperator Subsystem/Telerobot Demonstrator," Force Reflecting Hand Controller Equipment Manual, Jet Propulsion Laboratory, Jan. 1988.

Millman et al., "A System for the Implementation and Kinesthetic Display of Virtual Environments," Telemanipulator Technology, Proceedings of 1992 SPIE, vol. 1833, pp. 49-56.

Minsky et al., "Feeling and Seeing: Issues in Force Display," Computer Graphics, vol. 24, No. 2, Mar. 1990, pp. 235-270.

Minsky, "Computational Haptics: The Sandpaper System for Synthesizing Texture for a Force-Feedback Display," Massachusetts Institute of Technology Ph.D. Thesis, Jun. 1995, pp. 1-217.

Morgenbesser, "Force Shading for Shape Perception in Haptic Virtual Environments", Massachusetts Institute of Technology Master of Engineering Thesis, Sep. 1995, pp. 1-77.

MPB Technologies, Inc., "Freedom 3/6," 6 pages, 1996.

Payne et al., "Distance Field Manipulation of Surface Models," IEEE Computer Graphics & Applications, pp. 65-71 (Jan. 1992).

Salcudean et al., "On the Emulation of Stiff Walls and Static Friction with a Magnetically Levitated Input/Output Device," Dynamic Systems and Control: vol. 1, DSC-vol. 55-1, 1994, pp. 303-309.

Salisbury et al., "Haptic Rendering: Programming Touch Interaction with Virtual Objects," Presented and disseminated at the 1995 Symposium on Interactive 3D Graphics held Apr. 9-12, 1995 in Monterey, CA, sponsored by the Association for Computing Machinery (ACM) and published by the ACM in Proceedings: 1995 Symposium on Interactive 3D Graphics, Monterey, California, Apr. 9-12, 1995, pp. 123-130.

SensAble Devices, Inc., "Ghost Brochure," 1995, Cambridge, MA (2 pgs).

SensAble Technologies, Inc., "Phantom Haptic Interface," 1996, Cambridge, MA (6 pgs).

Shimoga, "A Survey of Perceptual Feedback Issues in Dextrous Telemanipulation: Part I. Finger Force Feedback" published by IEEE Neural Networks Council in IEEE Virtual Reality Annual International Symposium, held Sep. 18-22, 1993 in Seattle, Washington, 1993, pp. 263-270.

Snow et al., "Compact Force-Reflecting Hand Controller," NASA Tech Brief, vol. 15, No. 4 from Jet Propulsion Laboratory Report NPO-17851-7348, Apr. 1991, pp. i, 1-3, 1a-11a, 14a, 15a.

Sutter et al., "Response to Reflected-Force Feefback to Fingers in Teleoperations," Proc. of the NASA Conference On Space Telerobotics, pp. 65-74, NASA JPL. Jan. 1989.

Swarup, "Haptic Interaction with Deformable Objects Using Real-Time Dynamic Simulation", Massachusetts Institute of Technology, Sep. 1995, pp. 1-83.

Tanie et al., "Force Display Algorithms", 1993 IEEE International Conference on Robotics and Automation, May 2-7, 1993, Atlanta Georgia, USA, 1993, pp. 60-78.

Terzopoulos et al.; "Elastically Deformable Models"; Computer Graphics, vol. 21, No. 4, pp. 205-214 (Jul. 1987).

Wang et al., "Volume Sculpting", 1995 Symposium on Interactive 3D Graphics, Monterey, California, pp. 151-156.

Yoshikawa et al., "Construction of Virtual World Using Dynamics Modules and Interaction Modules," Proceedings of the 1996 IEEE International Conference on Robotics and Automation (Minneapolis, MN), pp. 2358-2364 (Apr. 1996).

Zilles et al., "A Constraint-Based God-object Method for Haptic Display," published by IEEE Computer Society Press, Los Alamitos, California, in Proceedings of the 1995 IEEE/RSJ International Conference on Intelligent Robots and Systems—Human Robot Interaction and Cooperative Robots, held Aug. 5-9, 1995 in Pittsburgh, Pennsylvania, 1995, pp. 146-151.

Zilles, "Haptic Rendering with the Toolhandle Haptic Interface," Massachusetts Institute of Technology Master of Science Thesis, May 1995, pp. 1-46.

Elhajj et al., "Supermedia-Enhanced Internet-Based Telerobotics," Proceedings of the IEEE, vol. 91, No. 3, pp. 396-421 (Mar. 2003).

Luo et al., "Networked Intelligent Robots Through the Internet: Issues and Opportunities," Proceedings of the IEEE, vol. 91, No. 3, pp. 371-382 (Mar. 2003).

Oboe, "Force-Reflecting Teleoperation Over the Internet: The JBIT Project," Proceedings of the IEEE, vol. 91, No. 3, pp. 449-462 (Mar. 2003).

Safaric et al., "Control of Robot Arm with Virtual Environment via the Internet," Proceedings of the IEEE, vol. 91, No. 3, pp. 422-429 (Mar. 2003).

Tan et al., "Virtual Environments for Internet-Based Robots—I: Modeling a Dynamic Environment," Proceedings of the IEEE, vol. 91, No. 3, pp. 383-388 (Mar. 2003).

Tan et al., "Virtual Environments for Internet-Based Robots—II: Path Planning," Proceedings of the IEEE, vol. 91, No. 3, pp. 389-395 (Mar. 2003).

"Revival of the Virtual Lathe," University of Michigan Virtual Reality Laboratory, http://www-vrl.umich.edu/sel_prj/lathe/, (Dec. 20, 2002).

Fuentes et al., "The Virtual Tool Approach to Dextrous Telemanipulation," Proceedings of the 1996 IEEE International Conference on Robotics and Automation (Minneapolis, MN), pp. 1700-1705 (Apr. 1996).

"3-D Animation Workshop," printed Jul. 29, 2003, http://webreference.com/3d/, Lessons 39, 64-68, and 72; 79 pgs.

Alejandre, "What is a Tessellation?" *The Math Forum, Drexel University*, printed Jul. 29, 2003, http://mathforum.org/sum95/suzanne/whattess.html, 4 pgs.

Altmann, "About Nonuniform Rational B-Splines—NURBS," Worcester Polytechnic Institute, printed Jul. 29, 2003, http://www.cs.wpi.edu/~matt/courses/cs563/talks/nurbs.html, 6 pgs.

Arraich, "Quick Mask," http://www.arraich.com/ref/aatool$_{13}$quick_mask6.htm, 3 pgs, 2000.2002.

Bentley, "Rendering Cubic Bezier Patches," Worcester Polytechnic Institute, printed Nov. 17, 2003, http://www.cs.wpi.edu/~matt/courses/cs563/talks/surface/bez_surf.html, 10 pgs.

Bim, "Tutorial: NURBS Head Modeling," printed Jul. 29, 2003, http://www.3drender.com/jbim/ea/HeadModel.html, 5 pgs.

"Curves." *Avid Technology*, printed Nov. 6, 2003, http://www.iro.umontreal.ca/~roys/softimage/html/model/curves.html, chapter 10, 10 pgs.

Farin, "NURBS," printed Nov. 17, 2003, www.eros.caqd.eas.asu.edu/~farin/rbook/toc.html, 2 pgs.

Feldman, "Texture Mapping," http://www.geocities.com/SiliconValley/2151.tmap.html (22 pgs)., 1997.

Fisher et al., "Pixel Values," http://www//dai.ed.ac.uk/HIPR2/value.htm (1 pg.), 2000.

Foskey et al., "*ArtNova*: Touch-Enabled 3D Model Design," Proceedings of IEEE Virtual Reality 2002, Mar. 24-28, 2002, Orlando, Florida pp. 119-126.

"Fundamentals of NURBS Modeling," *Avid Technology*, printed Nov. 6, 2003, http://www.iro.umontreal.ca/~roys/softimage/html/model/nurbs_basics.html, chapter 9,7 pgs.

Gu et al., "Global Conformal Surface Parameterization," Eurographics Symposium on Geometry Processing (2003), 12 pgs.

"How to use Postscript Art as a Stencil in Photoshop," *Swanson Tech Support Photoshop Techniques* 004, 4 pgs, 1994.

Komerska et al., "Haptic Interface for Center-of-Workspace Interaction: Demonstration Paper," *Haptics Interfaces for Virtual Environments and Teleoperator Systems* (*2002*), pp. 352-353.

Komerska et al., "Haptic Task Constraints for 3D Interactions," *Proceedings, IEEE Haptics Interfaces for Virtual Environments and Teleoperator Systems*, (Mar. 22-23, 2003), pp. 270-277.

Lenzmeier, "Color Depth and Color Spaces," http://www.csbsju.edu/itservices/teaching/c_space/colors.htm (3 pgs.), 2003.

"Lesson 12: Blur, Sharpen & Smudge," http://iit.bloomu.edu/vthc/Photoshop/enhancing/blurring.htm, 3 pgs., 2002.

"Lesson 14: Selection Tools," http://iit.bloomu.edu/vthc/Photoshop/BLENDING/selectiontools.htm, 7 pgs., 2002.

"Lesson 18: Opacity," http://iit.bloomu.edu/vthc/Photoshop/SpecialEffects/opacity.htm, 2 pgs., 2002.

"Lesson 22: Vector Shapes," http://iit.bloomu.edu/vthc/Photoshop/DRAWING/vectorshapes.htm, (5 pgs.), 2002.

"Lesson 23: Gradients," http://iit.bloomu.edu/vthc/Photoshop/DRAWING/gradients.htm (7 pgs.), 2002.

"Lesson 19: Color Selection," http://iit.bloomu.edu/vthc/Photoshop/DRAWING/colorpicker.htm (4 pgs.), 2002.

"Lesson 4: Layers," http://iit.bloomu.edu/vthc/Photoshop/Basics/layers.htm (2 pgs.), 2002.

"Lesson 7: Color Balance," http://iit.bloomu.edu/vthc/Photoshop/enhancing/colorbalance.htm (3 pgs.), 2002.

"Lesson 8: Brightness & Contrast," http://iit.bloomu.edu/vthc/Photoshop/enhancing/brightness&contrast.htm (2 pgs.), 2002.

Miller et al., "The Design of 3D Haptic Widgets," Proceedings of the 1999 Symposium on Interactive 3D Graphics Conference Proceedings, (1999) pp. 1-6.

Nagel, "A Closer Look: Photoshop's New Paint Engine, pp. 2 of 3," Mar. 7, 2002, http://www.creativemac.com/2002/03_mar/features/ps7dynamics1.htm (6 pgs.).

Nagel, "A Closer Look: Photoshop's New Paint Engine, Page 3 of 3" Mar. 7, 2002, http://www.creativemac.com/2002/03_mar/features/ps7dynamics1.htm (5 pgs.).

Nagel, "A Closer Look: Photoshop's New Paint Engine," Mar. 7, 2002, http://www.creativemac.com/2002/03_mar/features/ps7dynamics1.htm (5 pgs.).

O'Rourke, "Comp.Graphics.Alogrithms Frequently Asked Questions, Section 5. 3D Computations," http://www.exaflop.org/docs/cqafaq/cqa5.html (13 pgs.), 1998.

"Points, Nets, Patches . . . " printed Nov. 17. 2003, http://www.people.nnov.ru/fractal/splines/nets.htm, 2 pgs.

Porter et al., "Compositing Digital Images," Computer Graphics, vol. 18, No. 3, Jul. 1984, pp. 253-259.

Powerful Photoshop Layers: Layer Effects Settings, http://www/webreference.com/graphics/column32/5.html (5 pgs.), 2003.

Raindrop Geomagic, Inc. product description for "Geomagic Shape," Oct. 3, 2003, http://www.geomagic.com/products/shape, 2 pgs.

Raindrop Geomagic, Inc. product description for "Geomagic Shape," Nov. 26, 2003 printout, http://www.geomagic.com/products/shape, 2 pgs.

Raindrop Geomagic, Inc. product description for "Geomagic Studio," http://www.macdac.com/raindrop/studio.htm, (4 pgs), Oct. 2003 printout.

Rea, "Digital Photography and Electronic Imaging Glossary," Version 7.5.2 (Aug. 2000), 40 pgs.

Rogers, "An Introduction to NURBS," *Morgan Kaufmann Publishers*, (2000), pp. 1-4.

Sensable Technologies, "Feature Overview," Nov. 25, 2003 printout, http://www.sensable.com/products/3ddesign/freeform/overview.asp, 5 pgs.

Sensable Technologies, "Feature Overview: Emboss with Wrapped Image," Nov. 25, 2003 printout, http://www.sensable.com/products/3ddesign/freeform/emboss_with_wrap.asp, 1 pg.

Sensable Technologies, "Free Form Concept System," Jan. 20, 2004 printout, http://www.sensable.com/products/3ddesign/concept/index.asp, 2 pgs.

Sharman, "The Marching Cubes Algorithm," http://www.exaflop.org/docs/marchcubes/ind.html (6 pgs.), Sep. 2003 printout.

Sorkine, et. al, "Bounded-distortion Piecewise Mesh Parameterization," Proceedings of the Conference on Visualization 2002, Boston, Massachusetts, pp. 355-362.

Surfaces, *Avid Technology*, printed Nov. 6, 2003, http://www.iro.umontreal.ca/~roys/softimage/html/model/surfs.html, chapter 11, 22 pgs.

"Tensor Product Spline Surfaces," printed Nov. 17, 2003, http://www.ibiblio.org/e-notes/Spines/Inter.htm, 3 pgs.

"Touch-Enabled 3D Model Design," Department of Computer Science, University of North Carolina at Chapel Hill (Feb. 2002 ), 2 pgs.

Weisstein, "Conformal Mapping," *Wolfram Research*, printed Nov. 11, 2003, http://mathworld.wolfram.com/ConformalMapping.html, 7 pgs.

US 5,903,456, 05/1999, Schena et al. (withdrawn)

* cited by examiner

3-D SELECTION AND MANIPULATION WITH A MULTIPLE DIMENSION HAPTIC INTERFACE

This application is a continuation of U.S. patent application Ser. No. 10/133,242, filed Apr. 26, 2002 now U.S. Pat. No. 6,671,651, the entire disclosure of which is incorporated by reference herein.

FIELD OF THE INVENTION

This invention relates generally to manipulating virtual objects in a modeling environment. More particularly, the invention relates to the selection and manipulation of three-dimensional objects represented in a two-dimensional display space.

BACKGROUND OF THE INVENTION

Systems and methods for selecting and manipulating objects in computer-based modeling environments are known. Examples of existing systems that select and manipulate objects include circuit board design systems and systems used for designing mechanical objects, such as automobiles and airplanes. Some systems typically impose restrictions on a user, such as placing objects such as circuit elements on predefined planes. Other systems require a user to specify a location of a component with high precision in three dimensions and three angular orientations. The devices commonly used for providing information to the modeling system include alphanumeric input devices, such as keyboards, and cursor-based devices operating in two dimensions, such as computer mice and trackballs. Present computer-based modeling systems generally do not permit a user to readily modify an object that has been selected.

The stringent rules that present computer-based modeling systems impose and the inability of users to select, manipulate, and modify objects in a manner more akin to natural motion limits the ability of users to create models of three-dimensional objects.

SUMMARY OF THE INVENTION

The systems and methods of the invention provide a user the ability to select three-dimensional virtual objects in a three-dimensional modeling environment using two-dimensional representations of the objects. In broad overview, the invention involves a multidimensional degree of freedom haptic interface that controls a three-dimensional cursor. A user employs the cursor to select an arbitrary point on a three-dimensional virtual object on interest. The user can select the object by positioning the cursor so as to coincide with a point of the object in two of three dimensions, and issuing a select command. Through the application of a mathematical transformation, the system determines the difference between the position of a selected point on the object and the position of the cursor. The system displays the cursor at the location of the selected point on the object, so that the user can more easily manipulate or edit the object in the modeling environment. When the user releases the object after manipulation is completed, the cursor is relocated to the position it would have had the manipulations been applied to the cursor directly.

In one embodiment, the invention features a method for selecting an object in a three-dimensional modeling environment. The method includes the steps of generating a three-dimensional modeling environment containing one or more virtual objects and a three-dimensional cursor, determining a first three-dimensional cursor position in the three dimensional modeling environment, the three-dimensional cursor position corresponding to a position of an input device having at least three degrees of freedom, representing a first view of at least one of the one or more virtual objects in a first two-dimensional display space, representing the three-dimensional cursor position in the two-dimensional display space, and selecting one of the virtual objects based on a positional correspondence of the object and the cursor in the two-dimensional display space.

In some embodiments, the input device has at least six degrees of freedom. In one embodiment, the input device has exactly six degrees of freedom. In some embodiments, the virtual object is a selected one of a point, a straight line segment, a curvilinear segment, a spline, a two-dimensional representation, and a three dimensional representation.

In some embodiments, the method further includes the step of editing the selected virtual object. In some embodiments, editing the selected virtual object is a selected one of coloring the object, modifying the object, combining the object with another virtual object, grouping the object with another object, deleting the object, and renaming the object. In some embodiments, editing the selected virtual object includes sculpting the selected virtual object.

In some embodiments, the method further includes the step of performing a file function involving the selected virtual object. In some embodiments, performing a file function includes saving the object to a file.

In some embodiments, representing a first view of at least one of the one or more virtual objects includes representing the one or more virtual objects in a selected one of a perspective view and an orthogonal view.

In some embodiments, the method further includes the steps of selecting a local origin point on the selected virtual object and defining a mathematical transformation in the three-dimensional modeling environment, the mathematical transformation representative of the difference in location of the local origin point and the three-dimensional cursor position.

In some embodiments, the local origin point is an arbitrary point on the object. In some embodiments, defining the mathematical transformation includes defining a vector having a component directed orthogonal to the two-dimensional display space. In some other embodiments, defining the mathematical transformation includes defining a mathematical transformation having at least one of a three-dimensional translational vector, a rotation about the local origin point, and a rotation about the three-dimensional cursor position.

In some embodiments, the method further includes the steps of applying the transformation and manipulating the virtual object, the manipulation of the virtual object corresponding to a manipulation of the input device by the user.

In some embodiments, the method further includes the step of manipulating the virtual object, the manipulation of the virtual object corresponding to a manipulation of the input device by the user combined with an application of the transformation. In some embodiments, the manipulation of the input device includes at least one of a translational degree of freedom and a rotational degree of freedom. In some embodiments, the manipulation of the input device includes a simultaneous manipulation of two or more independent degrees of freedom. In some embodiments, the manipulation of the input device includes a simultaneous manipulation of three or more independent degrees of freedom. In some embodiments, the manipulation of the input device includes a simultaneous manipulation of six or more independent degrees of freedom.

In some embodiments, the method further includes the step of relocating the three-dimensional cursor to the location of the local origin point by application of the mathematical transformation. In some embodiments, the relocating step is performed only during the duration of the manipulation.

In some embodiments, the method further includes the step of providing a visual aid to help the user select and manipulate the virtual object. In some embodiments, providing the visual aid includes providing a user-activated constraint limiting a point to a locus aligned to an axis of the three-dimensional modeling environment.

In some embodiments, the method further includes the step of moving the three dimensional cursor to a position it would have if the manipulation of the input device by the user had been applied directly to the three dimensional cursor. In some embodiments, the moving step is performed upon a command issued by the user. In some embodiments, the command is a release of the selected virtual object.

In some embodiments, the method further includes the step of providing a visual aid to help the user select and manipulate the virtual object. In some embodiments, providing the visual aid includes providing a user-activated constraint limiting a point to a locus aligned to an axis of the three-dimensional modeling environment. In some embodiments, providing the visual aid includes providing a context-specific visual aid consistent with user-defined geometrical limitations. In some embodiments, providing the visual aid includes representing a second view of at least one of the one or more virtual objects in a second two-dimensional display space, the first two-dimensional display space and the second two-dimensional display space corresponding to different planes of the three-dimensional modeling environment. In some embodiments, representing the second view includes representing the second view on the second two-dimensional display space whose plane is orthogonal to a plane of the first two-dimensional display space.

In some embodiments, the input device is a haptic device. In some embodiments, the haptic device includes a haptic device providing force feedback to actuators operating in at least three degrees of freedom.

In some embodiments, the method further includes the step of providing a haptic aid to help the user select and manipulate the virtual object. In some embodiments, the haptic aid includes the provision of dynamic friction force during the positional correspondence of the object and the cursor in the two-dimensional display space. In some embodiments, during an activation of the user-activated visual constraint limiting a point to a locus aligned to an axis of the three-dimensional modeling environment, the haptic aid includes a haptic constraint limiting motion of the three-dimensional cursor to directions aligned to an axis of the three dimensional environment, except within a region of radius R about an identified point.

In some embodiments, the method further includes the step of contemporaneously displaying a visual aid component that indicates an axial location of the cursor along an axis. In some embodiments, during an activation of the user-activated visual constraint limiting a point to a selected line, the haptic aid includes a haptic constraint limiting motion of the three-dimensional cursor to the line.

In some embodiments, the method further includes the step of contemporaneously displaying a visual aid component that indicates the location of an axial location of the cursor along an axis. In some embodiments, during an activation of the user-activated visual constraint limiting a point to a selected plane, the haptic aid includes a haptic constraint limiting motion of the three-dimensional cursor to the plane.

In some embodiments, the method further includes the step of contemporaneously displaying a visual aid component that indicates the location of the plane.

In one aspect, the invention relates to an apparatus that permits a user to select an object in a three-dimensional modeling environment. The apparatus includes a computer that supports a three-dimensional modeling environment application, an input device that provides user input to the computer, the input device having at least three degrees of freedom, a modeling module that, when operating, generates the three-dimensional modeling environment using the computer, the three-dimensional modeling environment adapted to model one or more virtual objects and to employ a three-dimensional cursor, and a selection module responsive to user commands that, when operating, selects one of the virtual objects based on a two-dimensional positional correspondence of the object and the cursor.

In some embodiments, the apparatus further includes a display device that provides a two-dimensional display space for presenting to the user representations of the virtual object and the three-dimensional cursor in the modeling environment.

In some embodiments, the apparatus further includes a rendering module that, when operating, renders on the display device a view of the virtual object in a selected one of a perspective view and an orthogonal view. In some embodiments, the input device has at least six degrees of freedom. In one embodiment, the input device has exactly six degrees of freedom. In some embodiments, the virtual object is a selected one of a point, a straight line segment, a curvilinear segment, a spline, a two-dimensional representation, and a three dimensional representation.

In some embodiments, the apparatus further includes an editing module that, when operating, edits the selected virtual object in response to user input. In some embodiments, the editing module is a selected one of a module that sculpts the object, a module that colors the object, a module that modifies the object, a module that combines the object with another virtual object, a module that groups the object with another object, a module that deletes the object, a module that renames the object, and a module that performs a file function involving the object.

In some embodiments, the apparatus further includes a cursor tracking module that, when operating, determines a position of the three-dimensional cursor in the three dimensional modeling environment, the position of the cursor corresponding to a position of the input device, an object tracking module that, when operating, tracks a local origin point on the selected virtual object, and a transformation module that, when operating, defines a mathematical transformation in the three-dimensional modeling environment, the mathematical transformation representative of a difference in location of the local origin point and the three-dimensional cursor position at a time the user selects the virtual object. In some embodiments, the transformation module defines the mathematical transformation in terms of at least one of a three-dimensional translational vector, a rotation about the local origin point, and a rotation about the three-dimensional cursor position.

In some embodiments, the apparatus further includes an object manipulation module that, when operating, manipulates the virtual object, the manipulation of the virtual object corresponding to a manipulation of the input device by the user combined with an application of the transformation. In some embodiments, the object manipulation module represents the manipulation of the input device using at least one of a translational degree of freedom and a rotational degree of freedom. In some embodiments, the object manipulation module is adapted to manipulate at least two independent degrees of freedom simultaneously. In some embodiments, the object manipulation module is adapted to manipulate at least three independent degrees of freedom simultaneously. In some embodiments, the object manipulation module is adapted to manipulate at least six independent degrees of freedom simultaneously.

In some embodiments, the apparatus further includes a relocation module that, when operating, relocates the three-dimensional cursor to the location of the local origin point by application of the mathematical transformation. In some embodiments, the relocation module is operative only during the duration of the manipulation.

In some embodiments, the apparatus further includes a visual aid module that, when operating, provides a visual aid to help the user select and manipulate the virtual object. In some embodiments, the visual aid module is responsive to a user command, the visual aid module constraining a display of a point manipulated by a user to a locus aligned to an axis of the three-dimensional modeling environment.

In some embodiments, the apparatus further includes a cursor repositioning module that, when operating, moves the three dimensional cursor to a position it would have if the manipulation of the input device by the user had been applied directly to the three dimensional cursor. In some embodiments, the cursor repositioning module operates in response to a command issued by the user. In some embodiments, the command is a release of the selected virtual object.

In some embodiments, the apparatus further includes a visual aid module that, when operating, provides a visual aid to help the user select and manipulate the virtual object. In some embodiments, the visual aid module is responsive to a user command, the visual aid module constraining a display of a point manipulated by a user to a locus aligned to an axis of the three-dimensional modeling environment. In some embodiments, the visual aid module is responsive to a user command, the visual aid module constraining a display of a point manipulated by a user to a locus consistent with user-defined geometrical limitations. In some embodiments, the visual aid module represents a second view of at least one of the one or more virtual objects in a second two-dimensional display space, the first two-dimensional display space and the second two-dimensional display space corresponding to different planes of the three-dimensional modeling environment. In some embodiments, the visual aid module represents the second view on the second two-dimensional display space whose plane is orthogonal to a plane of the first two-dimensional display space.

In some embodiments, the input device is a haptic device. In some embodiments, the input device is a haptic device having force feedback actuators operating in at least three degrees of freedom to apply force to the user.

In some embodiments, the apparatus further includes a haptic aid module to help the user select and manipulate the virtual object. In some embodiments, the haptic aid module computes a dynamic friction force to be applied to the user by way of the haptic device during a positional correspondence of the object and the cursor in two dimensions of the three-dimensional modeling environment. In some embodiments, during an activation of the user-activated visual constraint limiting a point to a locus aligned to an axis of the three-dimensional modeling environment, the haptic aid module activates the force feedback actuators to provide haptic force to the user upon deviation of the point from the locus. In some embodiments, the visual aid module is additionally adapted to display a visual aid component that indicates a location of the cursor along an axis. In some embodiments, during an activation of the user-activated visual constraint limiting a point to a selected line, the haptic aid module activates the force feedback actuators to provide haptic force to the user upon deviation of the point from the line. In some embodiments, the visual aid module is additionally adapted to display a visual aid component that indicates a location of the cursor along a line. In some embodiments, during an activation of the user-activated visual constraint limiting a point to a selected plane, the haptic aid module activates the force feedback actuators to provide haptic force to the user upon deviation of the point from the plane. In some embodiments, the visual aid module is additionally adapted to display a visual aid component that indicates a location of the cursor on a plane.

The foregoing and other objects, aspects, features, and advantages of the invention will become more apparent from the following description and from the claims.

BRIEF DESCRIPTION OF THE DRAWINGS

The objects and features of the invention may be better understood with reference to the drawings, described below, and the claims. The drawings are not necessarily to scale, emphasis instead generally being placed upon illustrating the principles of the invention. In the drawings, like numerals are used to indicate like parts throughout the various views.

DETAILED DESCRIPTION

The methods and systems of the invention involve the use of a two-dimensional representation of objects that exist in a three dimensional modeling environment. One embodiment of a two-dimensional representation is the use of a computer display that presents objects using only two dimensions, such as rows and columns of pixels. A three-dimensional modeling environment is a computer application program that accepts as input, or constructs, one or more virtual objects which undergo computational operations in a computational space analogous to the real physical space that one is accustomed to. The computational operations represent physical operations that are being considered for performance on an object in real space.

There are many advantages to be gained by performing operations in a modeling environment before carrying out similar operations in reality, including savings in time, savings in the cost of materials, and the possibility of examining multiple models before deciding which model is most suitable for an intended purpose. However, in providing a representation that involves only two of the three dimensions of an object, information is lost, such as visual and tactile clues that would normally be available to the modeler who works on a real object. The methods and systems of the invention provide solutions that restore the lost information to the modeler or user of the system. A description of exemplary modeling environment equipment with which the methods and systems of the invention may be practiced will first be presented, and the detailed description of the methods and systems of the invention will follow.

Figure 1:
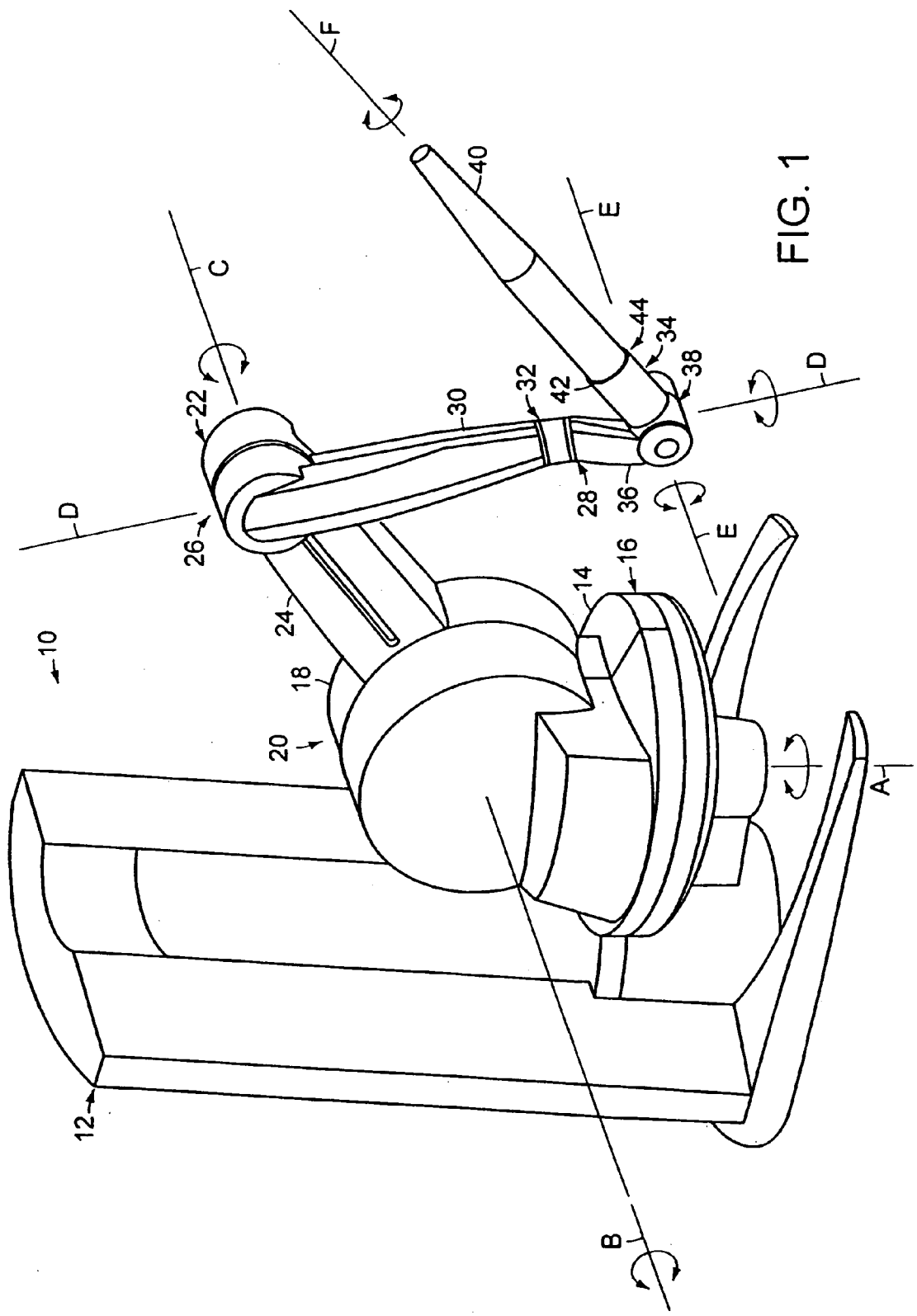
FIG. 1 is a schematic perspective view of a force reflecting haptic interface.

FIG. 1 is a schematic perspective view of an exemplary six degree of freedom force reflecting haptic interface 10 that can be used in accordance with one embodiment of the invention. The interface 10 can be used by a user to provide input to a device, such as a computer, and can be used to provide force feedback from the computer to the user. The six degrees of freedom of interface 10 are independent.

The interface 10 includes a housing 12 defining a reference ground, six joints or articulations, and six structural elements. A first powered tracked rotary element 14 is supported by the housing 12 to define a first articulation 16 with an axis "A" having a substantially vertical orientation. A second powered tracked rotary element 18 is mounted thereon to define a second articulation 20 with an axis "B" having a substantially perpendicular orientation relative to the first axis, A. A third powered tracked rotary element 22 is mounted on a generally outwardly radially disposed extension 24 of the second element 18 to define a third articulation 26 having an axis "C" which is substantially parallel to the second axis, B. A fourth free rotary element 28 is mounted on a generally outwardly radially disposed extension 30 of the third element 22 to define a fourth articulation 32 having an axis "D" which is substantially perpendicular to the third axis, C. A fifth free rotary element 34 is mounted on a generally outwardly radially disposed extension 36 of the fourth element 28 to define a fifth articulation 38 having an axis "E" which is substantially perpendicular to the fourth axis, D. Lastly, a sixth free rotary user connection element 40 in the form of a stylus configured to be grasped by a user is mounted on a generally outwardly radially disposed extension 42 of the fifth element 34 to define a sixth articulation 44 having an axis "F" which is substantially perpendicular to the fifth axis, E. The haptic interface of FIG. 1 is fully described in commonly-owned U.S. patent application Ser. No. 09/356,119, filed Jul. 16, 1999, which application is incorporated by reference herein in its entirety. Those familiar with the haptic arts will recognize that there are many different haptic interfaces that convert the motion of an object under the control of a user to electrical signals, many different haptic interfaces that convert force signals generated in a computer to mechanical forces that can be experienced by a user, and haptic interfaces that accomplish both results.

Figure 2:
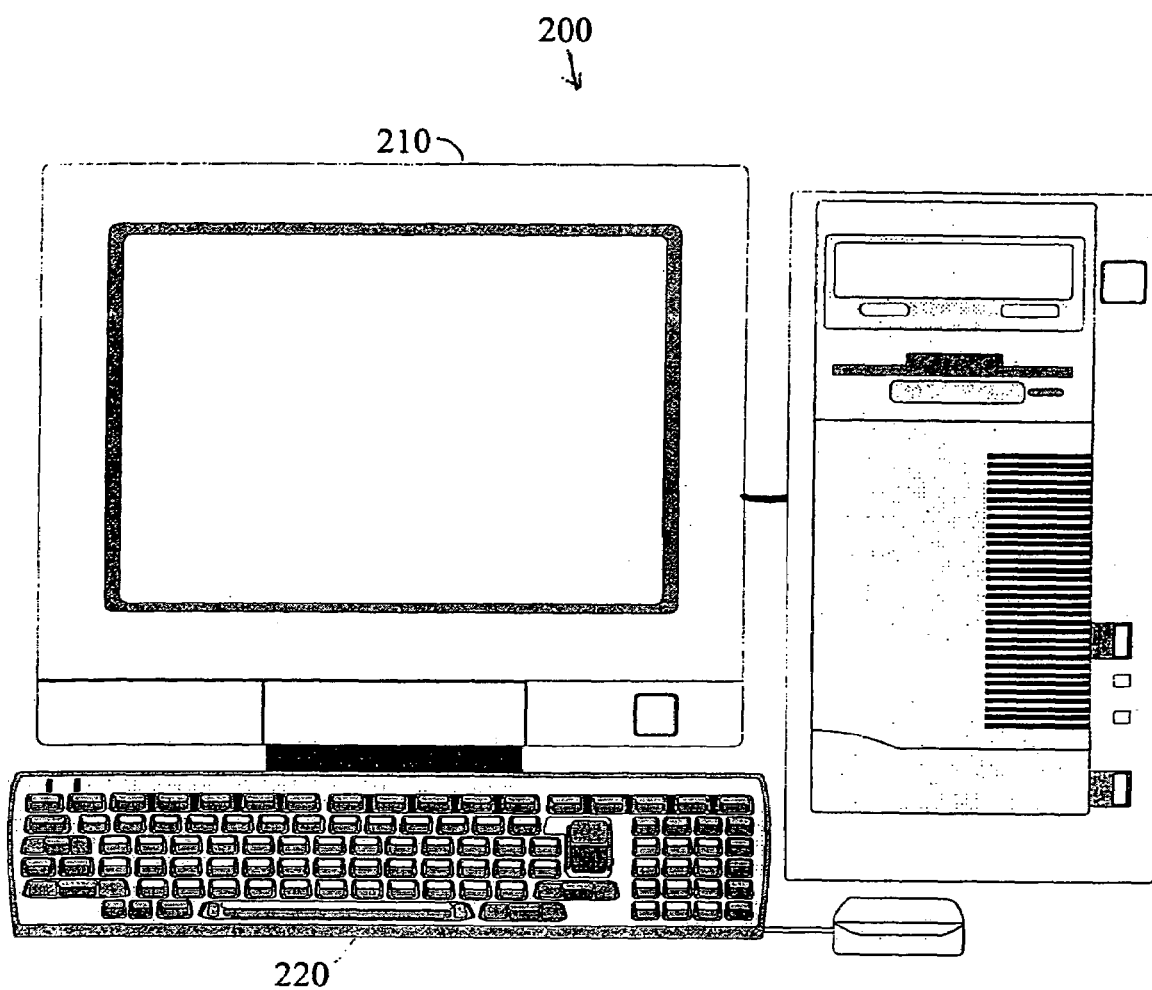
FIG. 2 illustrates a general purpose computer that can be used in accordance with one embodiment of the present invention.

FIG. 2 illustrates an exemplary general purpose computer 200 that can be used in accordance with one embodiment of the present invention, such as a commercially available personal computer that includes a CPU, one or more memories, one or more storage media, one or more output devices, such as a display 210, and one or more input devices, such as a keyboard 220. The computer operates using any commercially available operating system, such as any version of the Windows™ operating systems from Microsoft Corporation of Redmond, Wash., or the Linux™ operating system from Red Hat Software of Research Triangle Park, N.C. In some embodiments, a haptic device such as the interface 10 is present and is connected for communication with the computer 200, for example with wires. In other embodiments, the interconnection can be a wireless or an infrared interconnection. The interface 10 is available for use as an input device and/or an output device. The computer is programmed with software including commands that, when operating, direct the computer in the performance of the methods of the invention. Those of skill in the programming arts will recognize that some or all of the commands can be provided in the form of software, in the form of programmable hardware such as flash memory, ROM, or programmable gate arrays (PGAs), in the form of hard-wired circuitry, or in some combination of two or more of software, programmed hardware, or hard-wired circuitry. Commands that control the operation of a computer are often grouped into units that perform a particular action, such as receiving information, processing information or data, and providing information to a user. Such a unit can comprise any number of instructions, from a single command, such as a single machine language instruction, to a plurality of commands, such as a plurality of lines of code written in a higher level programming language such as C++. Such units of commands will be referred to generally as modules, whether the commands include software, programmed hardware, hard-wired circuitry, or a combination thereof. The computer and/or the software includes modules that accept input from input devices, that provide output signals to output devices, and that maintain the orderly operation of the computer. In particular, the computer includes at least one data input module that accepts information from the interface 10 which is indicative of the state of the interface 10 and its motions. The computer also includes at least one module that renders images and text on the display 210.

In alternative embodiments, the computer 200 is a laptop computer, a minicomputer, a mainframe computer, an embedded computer, or a handheld computer. The memory is any conventional memory such as, but not limited to, semiconductor memory, optical memory, or magnetic memory. The storage medium is any conventional machine-readable storage medium such as, but not limited to, floppy disk, hard disk, CD-ROM, and/or magnetic tape. The display is any conventional display such as, but not limited to, a video monitor, a printer, a speaker, an alphanumeric display, and/or a force-feedback haptic interface device. The input device is any conventional input device such as, but not limited to, a keyboard, a mouse, a force-feedback haptic interface device, a touch screen, a microphone, and/or a remote control. The computer can be a stand-alone computer or interconnected with at least one other computer by way of a network.

Figure 3:
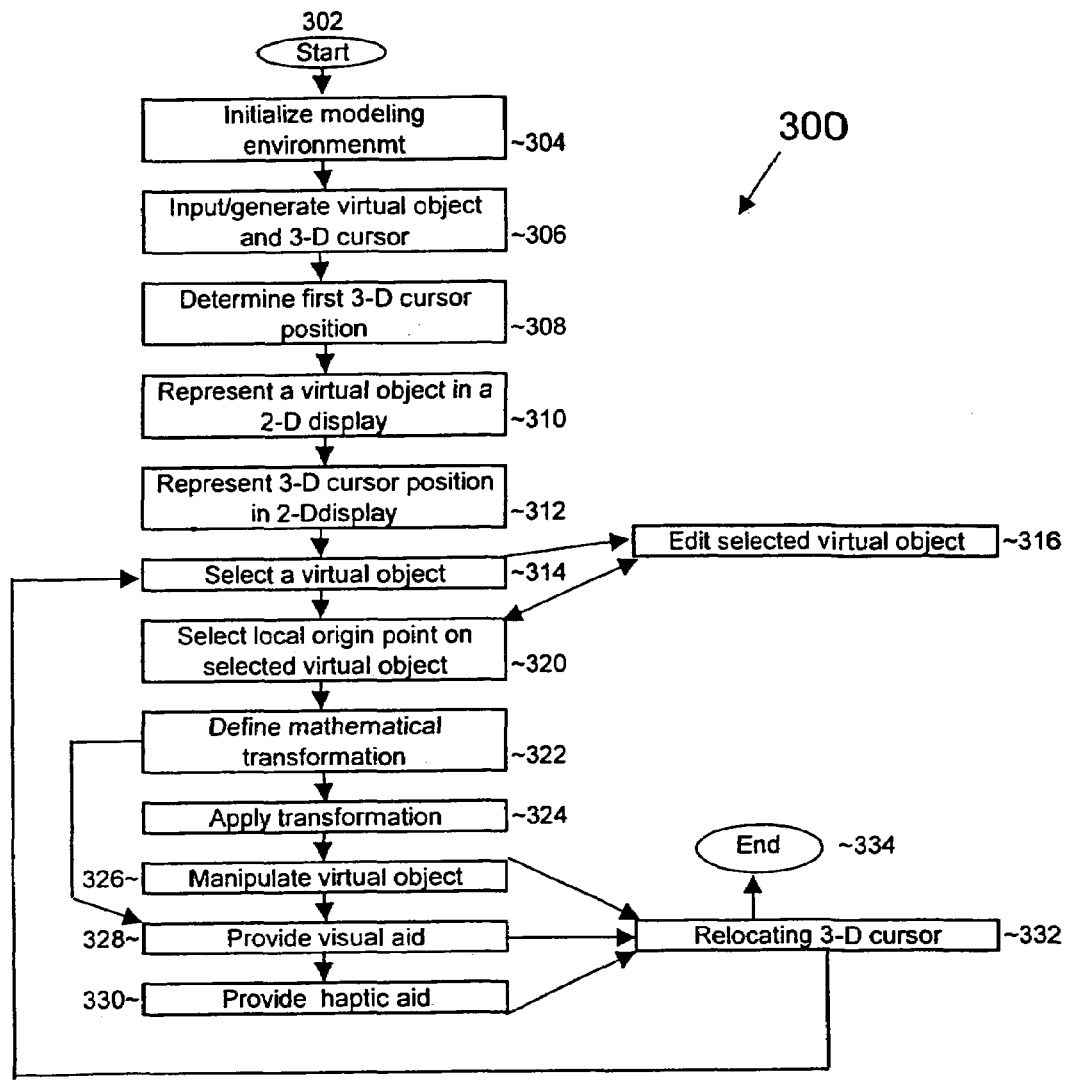
FIG. 3 is an illustrative flow diagram that shows the steps of one embodiment of the method of the invention.

FIG. 3 is an illustrative flow diagram 300 that shows the steps of one embodiment of the method of the invention. The figure also shows the flow of control among the modules of one embodiment of the system of the invention. The method begins at oval 302. The three-dimensional modeling application is initialized as a result of the operation of the modeling module, as indicated by box 304. The modeling application is populated with at least one virtual object and a three-dimensional cursor, as a result of the operation of modeling module, as indicated at box 306. The first position of the three-dimensional cursor is determined, as a result of the operation of the cursor tracking module, as indicated by box 308. As is described below in greater detail, the cursor position is determined in relation to the position of the interface 10 in real space, using such apparatus as position sensors, analog to digital converters, and buffers or similar locations in machine-readable memory to store values indicative of a location in space and a spatial orientation. In some embodiments, the initial location and orientation can be defined by default values.

One or more virtual objects that have been input or generated in the three-dimensional modeling environment are displayed in one view of a two-dimensional display, such as display 210, as a result of the operation of a rendering module, as indicated in box 310. Buffers or memory locations in the computer memory are used to store information indicative of the position and orientation of each virtual object in machine-readable memory. The position of the three-dimensional cursor is represented in the same view on the two-dimensional display, as a result of the operation of the rendering module, as indicated in box 312.

The user selects a virtual object, as indicated at box 314, by manipulating the three-dimensional cursor which is responsive to the motions of the interface 10 so as to coincide with the virtual object in two of three dimensions, such as the two dimensions of the two-dimensional display, and by issuing a selection command. The selection command can be any action that the computer is capable of sensing and that it is programmed to recognize, such as, for example, pushing a button, making an audible sound, or pressing a keyboard key. The selection process is monitored by the selection module.

The user can carry out different actions with regard to the selected virtual object. The user can edit the virtual object, as a result of user interaction with the editing module, as indicated at box 316. Editing an object can include, but is not limited to, coloring an object, modifying an object, combining an object with one or more other objects, grouping the object with one or more other objects, deleting the object, renaming the object, saving the object to a file, and performing other file functions that involve the object. In a preferred modeling application embodiment, editing the object involves sculpting the virtual object.

The user can also manipulate an object, whether the object is edited or not. The order of performing an edit and a manipulation is not restricted. In the flow diagram of FIG. 3, a bi-directional arrow connecting boxes 316 and 320 indicates that either action can precede or can follow the other, at the user's discretion.

The user can select a local origin point on the selected virtual object. The local origin point can be selected in an arbitrary manner from any point that is included in the selected virtual object. The user performs the selection of the local origin point in conjunction with the object tracking module, which monitors the selection process. The selection process is indicated at box 320.

When the local origin point and the position of the three-dimensional cursor are defined, the system of the invention defines a mathematical transformation. The transformation is a mathematical relationship that represents a difference in location of the local origin point and the position of the three-dimensional cursor at the time when the user selects the local origin point on the virtual object. The step of defining the mathematical transformation, which is performed by the transformation module, is indicated at box 322.

The user can manipulate the selected virtual object, which can be performed in conjunction with an object manipulation module that manipulates the selected object in correspondence with manipulations of the interface 10 by the user. It is more convenient for the user to see the manipulation with the three-dimensional cursor displayed at the position where the manipulation is applied to the virtual object. According to principles of the invention, the three-dimensional cursor is repositioned to coincide with the local origin point by application of the transformation to the position of the three-dimensional cursor, as indicated at box 324 of the flow diagram. The application of the transformation is performed by the transformation module, and a relocation module performs the relocation of the cursor, as indicated in the flow diagram at box 332.

The methods and systems of the invention also provide optional visual aids and optional haptic aids that can be of use to the user in determining relative locations and relative motions of the three-dimensional cursor with respect to objects. The optional visual and haptic aids are also useful with respect to recognizing relative position and relative motion of the three-dimensional cursor with respect to features of the three-dimensional modeling environment, such as locations, directions, planes, and volumes. The provision and operation of a visual aid module that defines and controls visual aids and of a haptic aid module that defines and controls haptic aids are denoted by boxes 328 and 330, respectively.

The selection and manipulation process is completed when the user releases an object, having selected an object and having performed editing and/or manipulation operations. The user can release the object by issuing a command recognized by the system as being a command to release the then-selected object, such as a key press or the like. The relocation module can reposition the cursor at the location that it would have if the manipulations that the user performed on the selected object had been performed directly on the position of the three-dimensional cursor. In other terms, the three-dimensional cursor can be relocated to the same position relative to the position of the interface 10 at the time the release command is issued as it had relative to the position of the interface 10 at the time the selection command was issued. The selection and manipulation process can be repeated as many times as the user wishes, as indicated by the loop back from box 332 to box 314. On any pass around the system, the user can select to perform a null selection at any step (i.e., do nothing, leave everything as it is) and proceed on to the next user-influenced step in the loop. When the user wishes, the user can cause the system and method to terminate operation at the oval End 334.

FIGS. 4 through 8 each show two panels. In each figure, the panel on the left is an exemplary view that a user sees on a conventional two-dimensional display, such as display 210 of FIG. 2. The panel on the right of each figure is an optional additional exemplary view in a plane different from the plane of the panel on the left. In some embodiments, the panel on the right corresponds to a plane that is orthogonal to the plane of the view on the left panel. In some embodiments, the additional view may optionally be provided to a user. The additional view is useful to explain the methods and systems of the invention. In the figures presented here, the additional view is shown at a smaller scale than the view in the left panel.

Figure 4:
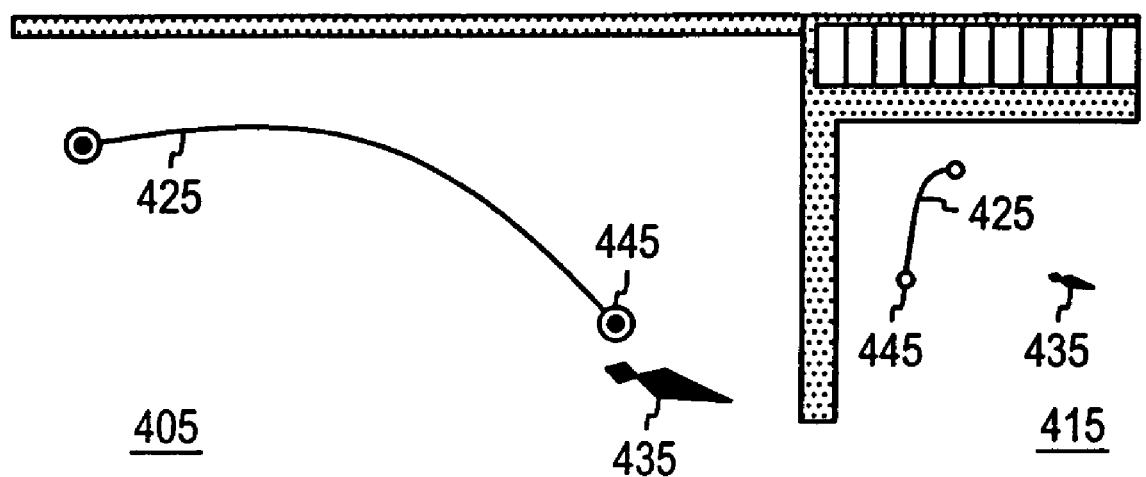
FIG. 4 shows an exemplary three dimensional virtual object that is generated in a three-dimensional modeling environment, along with a three dimensional cursor, according to principles of the invention.

FIG. 4 shows an illustrative three dimensional virtual object 425 that is generated in a three-dimensional modeling environment, along with a three dimensional cursor 435. The three-dimensional modeling environment is generated by a modeling module that, when it is operating on the computer 200, initializes a three-dimensional modeling space, and that has the capacity to contain one or more virtual objects and a three-dimensional cursor. The three dimensional virtual object 425 is displayed in two dimensions on a two-dimensional display 210. The three dimensional cursor 435 indicates a position in the three-dimensional modeling environment corresponding to a position of the haptic interface 10 that is controlled in real space by the user. In various embodiments, the three-dimensional virtual object is a selected one of a point, a straight line segment, a curvilinear segment, a spline, a two-dimensional representation, and a three dimensional representation. As indicated in the left panel 405 of FIG. 4, the coordinates of the three-dimensional cursor 435 in the two-dimensional display 210 are close to coordinates corresponding to a point 445 of object 425. However, as is seen in the panel on the right 415, the third dimensional coordinate of the three-dimensional cursor 435 differs considerably from the third coordinate of the point 445 along the third dimension of the three dimensional display space. This difference highlights one of the problems that the methods and systems of the invention overcome.

Figure 5:
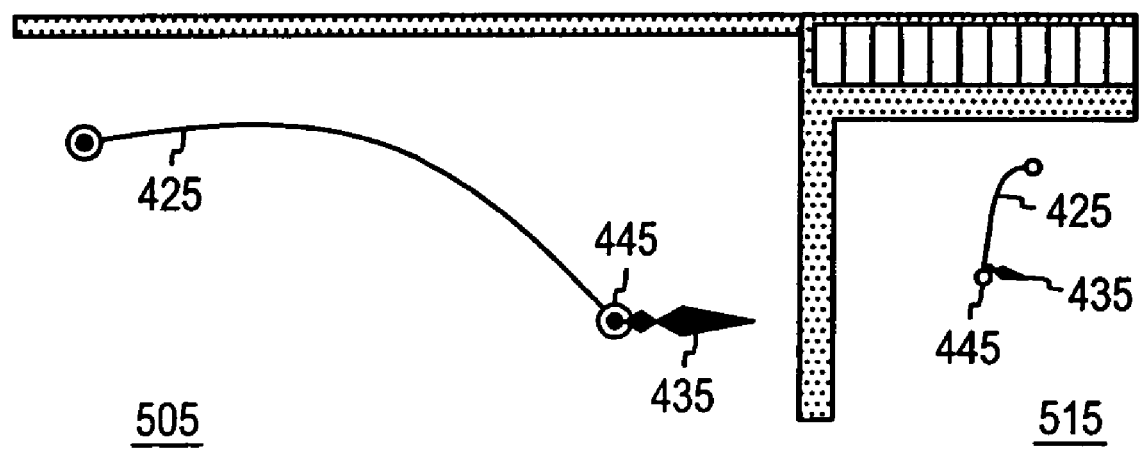
FIG. 5 shows an illustrative example of a circumstance wherein the user brings the position of the interface into collocation with an intended point of an object.

FIG. 5 shows an illustrative example of a circumstance wherein the user brings the position of the interface 10 into collocation with the intended point 445 of object 425. FIG. 5 shows an illustrative diagram in which the three-dimensional cursor 435 is collocated with a point 445 of the two dimensional object 425 in all three dimensions, as shown in the two dimensional display 210 on the left panel 505, and in the panel on the right 515. However, if the user has only the visual clues provided by the left panels of FIGS. 4 and 5 as guidance, the user is hard-pressed to determine either that the position of the three-dimensional cursor 435 in FIG. 5 is at the desired location, or that the position of the three dimensional cursor 435 in FIG. 4 is far from the correct position along the third dimension.

Figure 6:
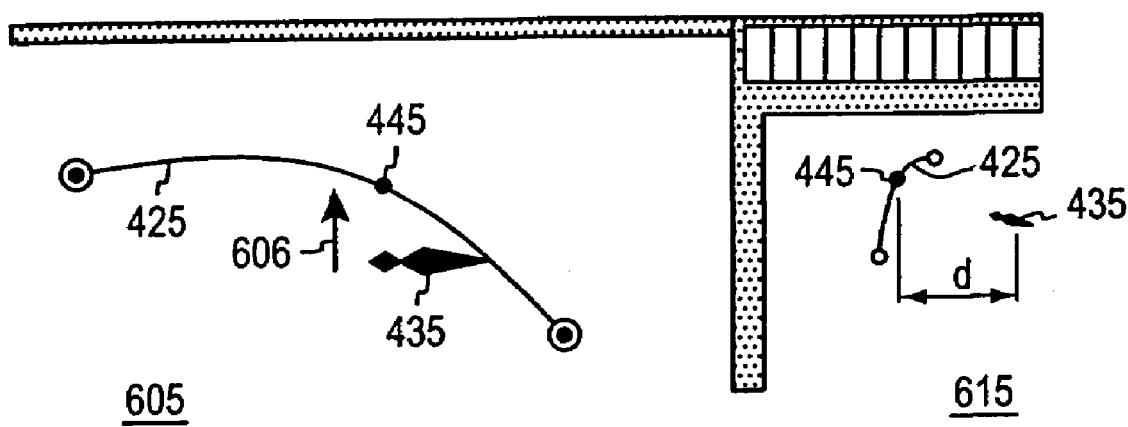
FIG. 6 shows an illustrative example in which the user has controlled the position of the interface so as to bring the three-dimensional cursor near coincidence in two dimensions with a point on a virtual object, according to principles of the invention.

FIG. 6 shows an illustrative example in which the user has controlled the position of the interface 10 so as to bring the three-dimensional cursor 435 near coincidence in two dimensions with a point 445 on object 425, as shown in panel 605 on the left. The optional additional view in the right hand panel 615 shows an offset distance d along the dimension perpendicular to the plane of the view of panel 605, between the three dimensional cursor 435 and the point 445. The user, by controlling the interface 10, causes the three dimensional cursor 435 to move upward in the direction of the arrow 606 in panel 605. The three-dimensional cursor 435 in panel 615 moves in the same direction in response to the user controlling the interface 10. If a plurality of virtual objects are displayed on display 210, the user can select any point of any virtual object that is visible to the user.

Figure 7:
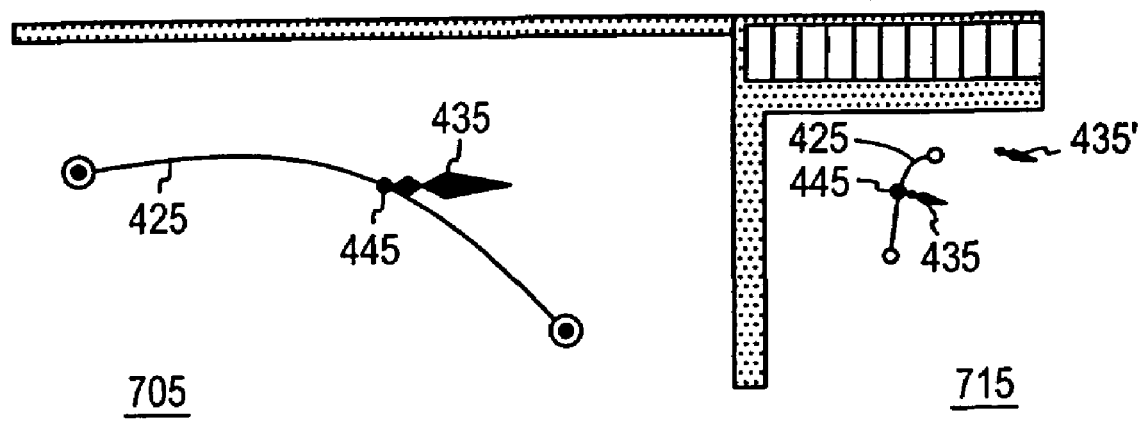
FIG. 7 shows an illustrative example of the operation of the methods and systems of the invention when the three-dimensional cursor reaches the location of a point of a virtual object.

FIG. 7 shows an illustrative example of the operation of the methods and systems of the invention when the three-dimensional cursor 435 reaches the location of the point 445 of object 425 in two dimensions as displayed on two dimensional display 210. At such time that the three-dimensional cursor 435 is collocated with the point 445, the user can issue a command, for example by pressing a button on a mouse or on the haptic interface, depressing a key on a keyboard, making an audible sound, or some equivalent action. The system recognizes the command, and causes the selection of object 425. The user can pick the point 445 arbitrarily from any point on the virtual object 425. In FIG. 7, selected virtual object 425 is shown in a somewhat heavier weight line than is the unselected virtual object 425 in FIG. 6. The viewer/user can observe the selection by a visual change in the virtual object 425 as it is displayed on the two-dimensional display 210. The point 445 is treated as a local origin on the selected virtual object 425. The local origin point 445 can be represented for example in a computer memory as a discrete array that contains three positional coordinates and three angular coordinates, which values are initialized at the time of selection of virtual object 425.

At the same time, the location of three-dimensional cursor 435 is brought into three-dimensional collocation with the point 445, by a transformation module operating on the computer 200 that determines a transformation in the three-dimensional modeling environment. In the right panel 715 of FIG. 7, the transformation is a vector extending from the position 435' of the three-dimensional cursor at the time the user issues the selection command to the location 435 on object 425. For the example shown in FIG. 7, the transformation is substantially a vector having a component directed orthogonal to the two-dimensional display space of panel 705. In some embodiments, the transformation can include vectorial components corresponding to each of the dimensions of the modeling space, and can also include angular displacements, or rotations, centered at either or both of the position in the three dimensional modeling space of the input device, such as interface 10, or the position of the local origin point 445.

As will be apparent to those of skill in the arts relating to mathematical transforms, there can be representations of three-dimensional space in a variety of different mathematical representations that can be shown to be equivalents of each other. For convenience of exposition, the present description is given using conventional Cartesian coordinates having three mutually perpendicular rectilinear dimensions. Equivalently, one could represent the three-dimensional modeling space using other coordinate systems such as polar coordinates, cylindrical coordinates, or another coordinate system, as desired.

There are many purposes for selecting a virtual object in the three dimensional modeling space. For example, the user can select an object for editing. An editing module within the computer performs editing functions in response to commands from the user.

Figure 8:
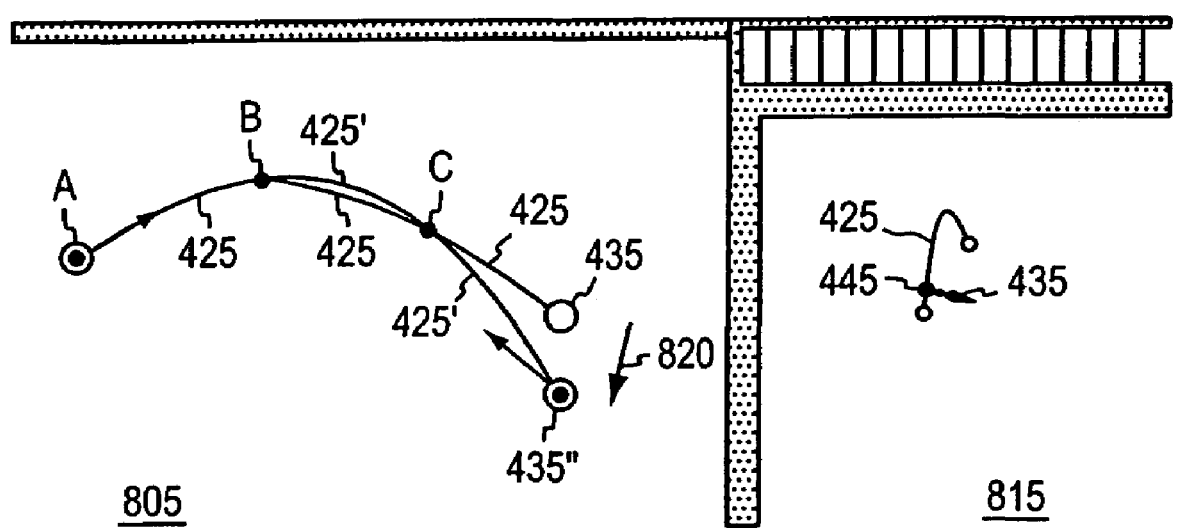
FIG. 8 is a diagram that shows an illustrative manipulation of a virtual object combined with application of a transform, according to principles of the invention.

FIG. 8 is a diagram that shows an illustrative manipulation of a virtual object combined with application of a transform. As shown in the right panel 815 of FIG. 8, the three-dimensional cursor 435 is collocated with the selected local origin point 445 of virtual object 425 as a result of the application of the transformation determined by the transformation module. The user can manipulate the interface 10 as an input device, in order to manipulate the virtual object 425. As shown in the left panel 805, when, for example, the user moves the input device 10 in a substantially downward direction, the motion of the input device 10 is tracked by a cursor tracking module within the computer. The cursor tracking module determines a location of the three-dimensional cursor 435 within the three-dimensional modeling environment, which position corresponds to a position of the input device 10 as it is manipulated by the user. For a substantially downward and slightly sideward motion of the input device 10, as indicated by the arrow 820, the position of the cursor 435 follows the motion of the input device 10 to the location given by 435". In addition, the object 425 is transformed to a shape corresponding to that of object 425'. In the embodiment shown, the locus of object 425 has been constrained to pass through points A, B and C, so object 425' deviates from object 425 between point 435' and point C and between points B and C, but not at points B and C themselves. In one embodiment, the cursor tracking module is initiated when the modeling environment starts to operate, and enunciators within the input device 10 send signals to the cursor tracking module that allow the module to follow the users' manipulations of the input device 10 in both translational and rotational degrees of freedom.

An object tracking module follows the motions of each virtual object that is created within the three-dimensional modeling environment. In one embodiment, an object tracking module is initialized when a virtual object 425 is created within the three-dimensional modeling environment. The object tracking module receives input corresponding to the manipulation of the input device 10 by the user, and updates that location of the virtual object 425. In one embodiment, the object tracking module tracks the location of the local origin point 445 on the selected virtual object 425.

A relocation module applies the transformation to the three-dimensional cursor 435. In one embodiment, the relocation module applies that transformation only during the time period when the virtual object 425 is selected. During the period when the mathematical transformation has been applied to the three-dimensional cursor 435, the three-dimensional cursor 435 appears at the location of the local origin point 445. The user is provided a visual aid in manipulating the virtual object 425, in that a deviation in location between the virtual object 425 and the three-dimensional cursor 435, and equivalently, the third dimensional location of the input device 10, is eliminated temporarily while the user manipulates the virtual object 425. The user can manipulate the virtual object 425 in correspondence with the manipulation of the input device 10, such as the haptic interface. In the frame of reference that the user experiences, it is as if the user was grasping the virtual object directly, rather than manipulating it over a distance. The user can manipulate any of the degrees of freedom of the input device 10, individually, in any combination, or all simultaneously. In an embodiment employing the six degree of freedom input device depicted in FIG. 1, the user can manipulate one, two, three, four, five, or all six degrees of freedom in any combination and at any time.

Other visual aids can be provided for the user. In some systems, constraints that limit a point or a motion in some way can be implemented, by the expedient of invoking one or more suitable constraint equations. Examples of constraints that can be applied to a visual representation of a three-dimensional model include limiting a point to move along a specific locus or plane. In one embodiment, the point can be constrained to move along axial directions that are aligned to an axis of the three-dimensional modeling environment. In some embodiments, the constraint to move along an axial direction may be applied in response to a command from a user. In another embodiment, visual aids that indicate the location of a point along an axial direction, along a line, on a plane, or within a volume are provided to assist a user in visualizing relationships between objects, modifications of objects, and motions of objects. In some embodiments, the visual aid can be a context-specific visual aid consistent with a user-defined geometrical limitation, such as the constraint by a user that a surface remain smooth during manipulation, or that a surface remain convex.

When the user desires to cease manipulating the selected virtual object 425, the user can issue a command, such as repeating the command issued to select the virtual object 425. Alternatively, the user can issue another command specifically available to indicate to the computer 200 that manipulation of the selected object 425 is complete, at least for the moment. Upon issuance of such a command, the cursor tracking module moves the three-dimensional cursor 435 to the location that it would have if the manipulation of the input device 10 by the user had been applied directly to the three-dimensional cursor. There are numerous ways in which such a result can be attained, as will be apparent to those skilled in the art. One is, as indicated, the direct manipulation of the location of the three-dimensional cursor 435 beginning with its position at the start of manipulation in parallel with the manipulation of the virtual object 425, followed by a rendering of the three-dimensional cursor 435 at the final location when the command to cease manipulation of the selected virtual object is issued. Another is the application of the inverse of the transformation originally applied to the three-dimensional cursor to the final position of the three-dimensional cursor. Yet another is the application of the inverse of the transformation originally applied to the three-dimensional cursor to the final position of the local origin point 445, which moves with the three-dimensional cursor during the manipulation. Still other computations can be performed that produce an equivalent result.

The haptic input device 10 may be available for use throughout the process of selecting, editing, manipulating, and releasing a virtual object, as well as during operation of visual display operations of the computer system, including the provision of visual aids to the user. The haptic input device 10 is also capable of providing haptic force feedback to the user in any one or more of all six degrees of freedom. In some embodiments, the haptic force feedback function provides yet another aid, namely a haptic aid, to the user. In some embodiments, the haptic force feedback device 10 provides dynamic frictional forces during a positional correspondence of the virtual object and the cursor in the two-dimensional display space, for example, to indicate the correspondence to the user.

The haptic aids can also be applied in concert with visual aids. In one embodiment, when the user-activated visual constraint limiting a point to a locus aligned to an axis of the three-dimensional modeling environment is operating, the haptic aid includes a haptic constraint, limiting motion of the three-dimensional cursor to directions aligned to an axis of the three dimensional environment, except within a region of radius R about an identified point. The dimension R depends on the precision that the user wants to obtain. An exemplary radius is 25 pixels. In one embodiment, the haptic aid is contemporaneously accompanied by a display of a visual aid component that indicates an axial location of the cursor along an axis.

In one embodiment, when the user-activated visual constraint limiting a point to a selected line is operating, the haptic aid includes a haptic constraint limiting motion of the three-dimensional cursor to the line. In one embodiment, the haptic aid is contemporaneously accompanied by a display of a visual aid component that indicates the location of an axial location of the cursor along an axis.

In one embodiment, when the user-activated visual constraint limiting a point to a selected plane is operating, the haptic aid includes a haptic constraint limiting motion of the three-dimensional cursor to the plane. In one embodiment, the haptic aid is contemporaneously accompanied by a display of a visual aid component that indicates the location of the plane.

Figure 9:
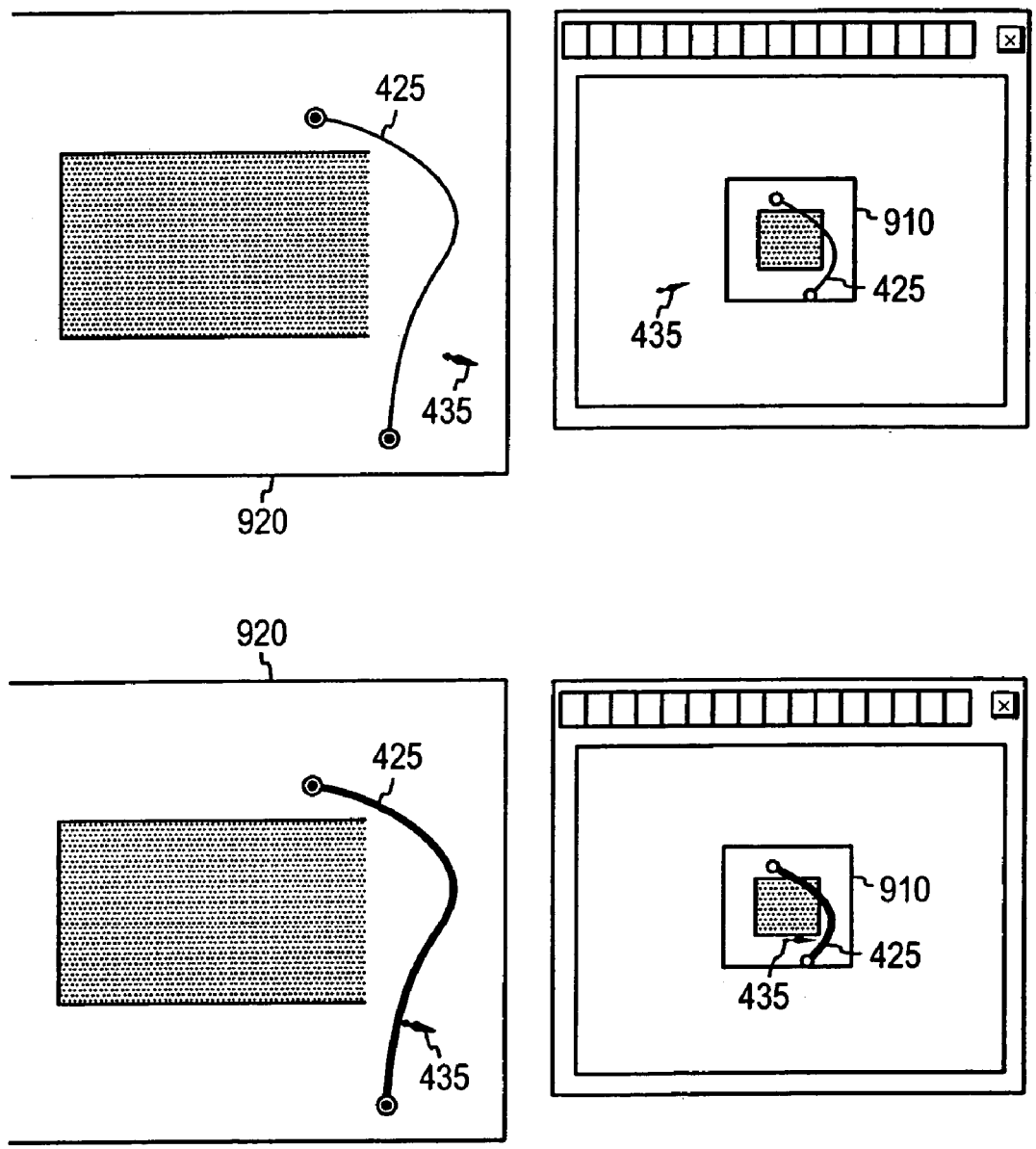
FIG. 9 is a drawing that illustrates an embodiment in which a selection of a virtual object is depicted when a display is operating in an orthogonal view mode, without perspective, according to principles of the invention.
Figure 10:
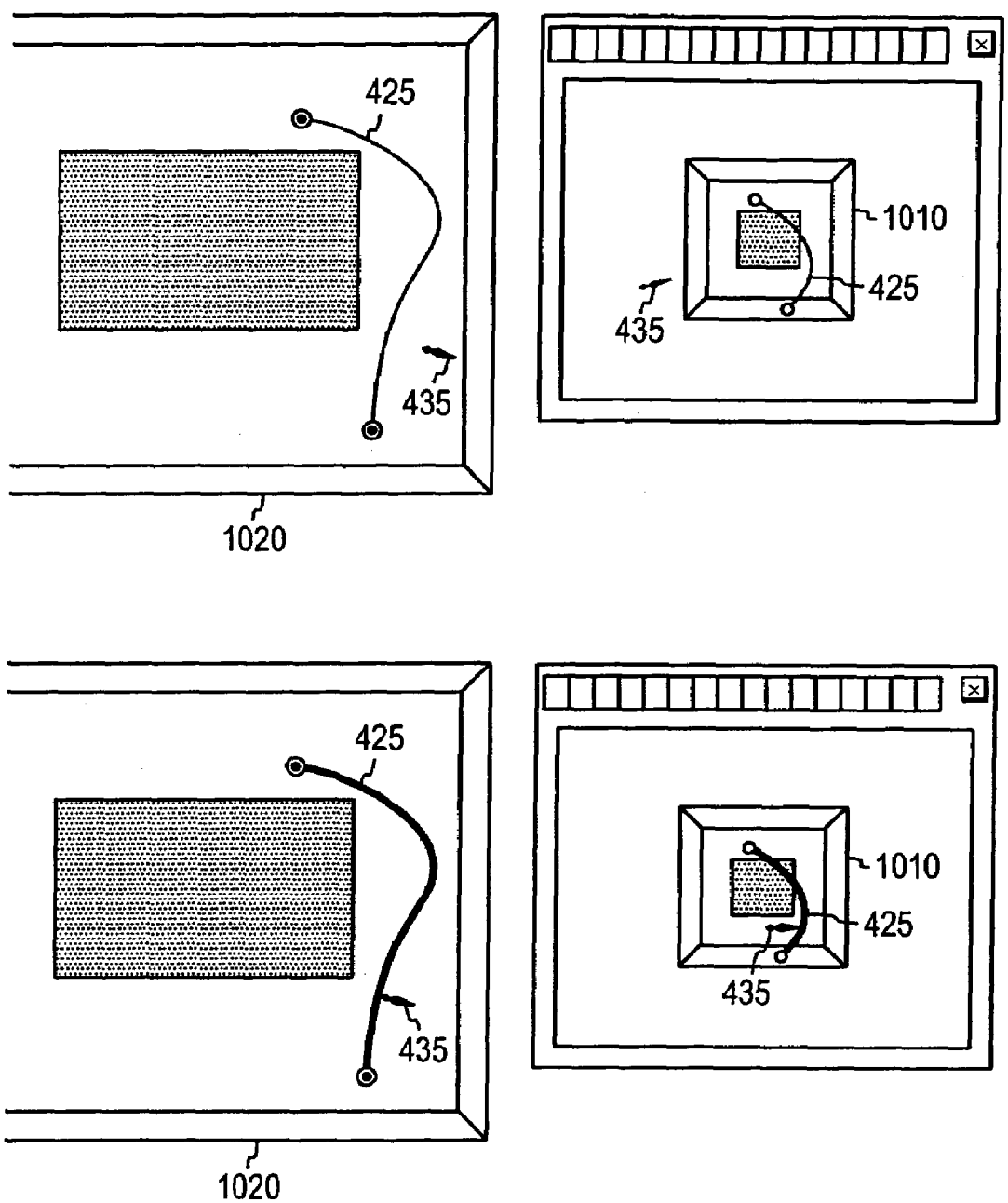
FIG. 10 is a drawing that illustrates an embodiment in which a selection of a virtual object is depicted when a display is operating in a perspective view mode, according to principles of the invention.

FIG. 9 is a drawing that illustrates an embodiment in which a selection of a virtual object 425 is depicted when a display 210 is operating in an orthogonal view mode, without perspective. In FIG. 9, a wire frame 910, 920 appears as a simple two-dimensional line drawing. FIG. 10 is a drawing that illustrates an embodiment in which a selection of a virtual object 425 is depicted when a display 210 is operating in a perspective view mode. FIG. 10 shows substantially the same view as FIG. 9, with the inclusion of visual aids in the form of a wire frame 1010, 1020 shown in perspective. As described above, in the two upper images of each figure, the selection has not yet been made, and the three-dimensional cursor 435 is not coincident with a virtual object 425. In the lower images, the three-dimensional cursor 435 is coincident with a virtual object 425, which appears in heavier weight. As described above, the left panels depict a first view of the virtual objects and the three-dimensional cursor, and the right panels depict an optional second view having a view plane different from the view plane of the panels on the left.

In the situation where a first virtual object occludes a second virtual object from the view of the user, the user can select the first virtual object and move it, or can select it and erase it, so as to leave the second virtual object visible. In similar manner, any virtual object can be iteratively selected, manipulated, released, selected again at the same or at a different point on the object, manipulated again, released again, and so forth as many times as the user desires.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for selecting an object in a three-dimensional modeling environment, the method comprising the steps of:
   determining a position of a cursor in a three-dimensional modeling environment, the environment containing one or more virtual objects;
   providing a two-dimensional representation of the cursor and at least one of the virtual objects; and
   selecting a virtual object based on a positional correspondence of the selected object and the cursor in the two-dimensional representation, wherein the providing step comprises providing a first view of the cursor and at least one of the virtual objects in a first two-dimensional display space and a second view of the cursor and at least one of the virtual objects in a second two-dimensional display space, wherein the first and second display spaces correspond to different planes of the three-dimensional modeling environment.

2. The method of claim 1, wherein the position of the cursor corresponds to a position of an input device in real space.

3. The method of claim 2, wherein the input device is user-controlled.

4. The method of claim 2, wherein the input device has at least six degrees of freedom.

5. The method of claim 2, wherein the input device is a haptic device.

6. The method of claim 5, wherein the haptic device is adapted to apply a force to a user when the cursor coincides with the object in two of three dimensions.

7. The method of claim 6, wherein the force is a friction force.

8. The method of claim 1, wherein the selecting step comprises selecting a virtual object upon issuance of a user command at a time when the cursor coincides with the object in two of three dimensions.

9. The method of claim 1, further comprising the step of applying a mathematical transformation to determine the positional correspondence.

10. The method of claim 1, wherein the two-dimensional representation is a two-dimensional view.

11. The method of claim 10, wherein the two-dimensional view is a selected one of a perspective view and an orthogonal view.

12. An apparatus that permits a user to select an object in a three-dimensional modeling environment, the apparatus comprising:
   an input device that provides user input to a computer;
   computer software that, when operating with the computer and the user input, determines a position of a cursor in a three-dimensional modeling environment, selects a virtual object in the modeling environment based on a two-dimensional positional correspondence of the object and the cursor, and provides a first view of the cursor and the virtual object in a first two-dimensional display space and a second view of the cursor and the virtual object in a second two-dimensional display space, wherein the first and second display spaces correspond to different planes of the three-dimensional modeling environment.

13. The apparatus of claim 12, wherein the input device has at least six degrees of freedom.

14. The apparatus of claim 12, wherein the input device is a haptic device.

15. The apparatus of claim 14, wherein the haptic device is adapted to apply a force to a user when the cursor coincides with the object in two of three dimensions.

16. The apparatus of claim 15, wherein the force is a friction force.

* * * * *